United States Patent [19]
Brown

[11] Patent Number: 5,661,348
[45] Date of Patent: Aug. 26, 1997

[54] METHOD AND APPARATUS FOR PASSIVE INPUT CURRENT WAVEFORM CORRECTION FOR UNIVERSAL OFFLINE SWITCHMODE POWER SUPPLY

[75] Inventor: Alan E. Brown, Georgetown, Tex.

[73] Assignee: Dell USA L.P., Austin, Tex.

[21] Appl. No.: 503,782

[22] Filed: Jul. 18, 1995

[51] Int. Cl.⁶ .................................................... H02J 3/01
[52] U.S. Cl. .................. 307/43; 363/21; 363/61; 363/126; 363/143; 323/282
[58] Field of Search ................. 307/43; 363/26, 363/17, 21, 61, 126, 143; 323/271, 220, 282

[56] References Cited

U.S. PATENT DOCUMENTS

| | | | |
|---|---|---|---|
| 4,268,899 | 5/1981 | Rokas | 363/61 |
| 4,780,805 | 10/1988 | Chewuk et al. | 363/142 |
| 4,837,672 | 6/1989 | Donze | 363/143 |
| 5,119,283 | 6/1992 | Steigerwald et al. | 363/37 |
| 5,138,547 | 8/1992 | Swoboda | 363/143 |
| 5,162,984 | 11/1992 | Castagnet et al. | 363/61 |

Primary Examiner—William M. Shoop, Jr.
Assistant Examiner—Albert W. Paladini
Attorney, Agent, or Firm—Stanford & Bennett

[57] ABSTRACT

A universal offline switch mode power supply including an input stage having an input filter inductor and a switch for switching between a first lower AC input voltage or a second higher AC input voltage. A bridge rectifier full-wave rectifies the higher AC voltage when the switch is in a first position, where the filter inductor serves to filter the higher AC voltage. The higher AC voltage is preferably approximately 230 V rms. The bridge rectifier and two bulk capacitors serve to double the lower AC voltage when the switch is in a second position, where the lower AC voltage is preferably approximately 115 V rms. Also, the input filter is bypassed for the lower AC voltage. The switch is preferably an SPST switch. In the preferred embodiment, the inductor is placed between one AC input line and one input of a bridge rectifier circuit. The outputs of the bridge rectifier circuit are placed across two series input bulk capacitors and to the input of a switchmode power converter. The switch is placed between the same AC input line coupled to the inductor and the junction between the bulk capacitors. When the switch is in its closed position, the filter inductor is effectively bypassed and the diodes of the bridge rectifier circuit and the bulk capacitors serve as a voltage doubler for 115 V rms operation. With the switch is in its open position, the filter inductor performs filtering for the 230 V rms operation and the bridge rectifier circuit full-wave rectifies the AC input voltage.

20 Claims, 3 Drawing Sheets

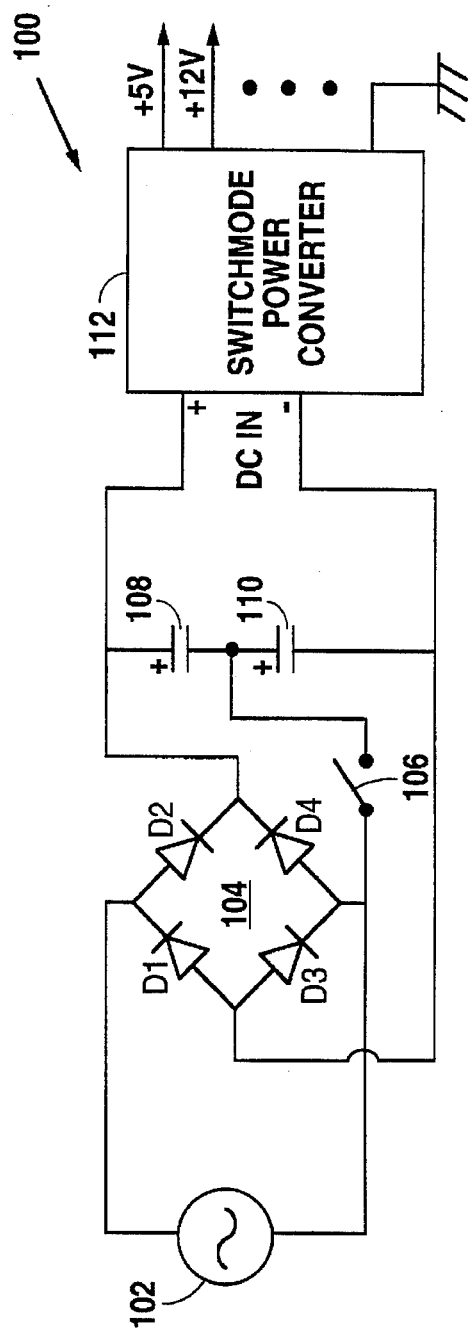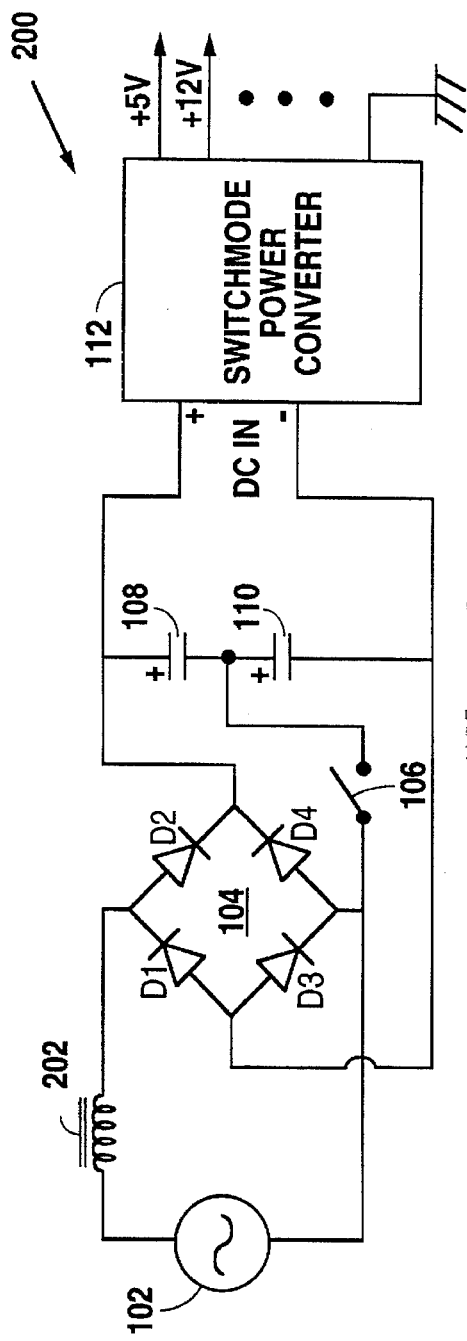

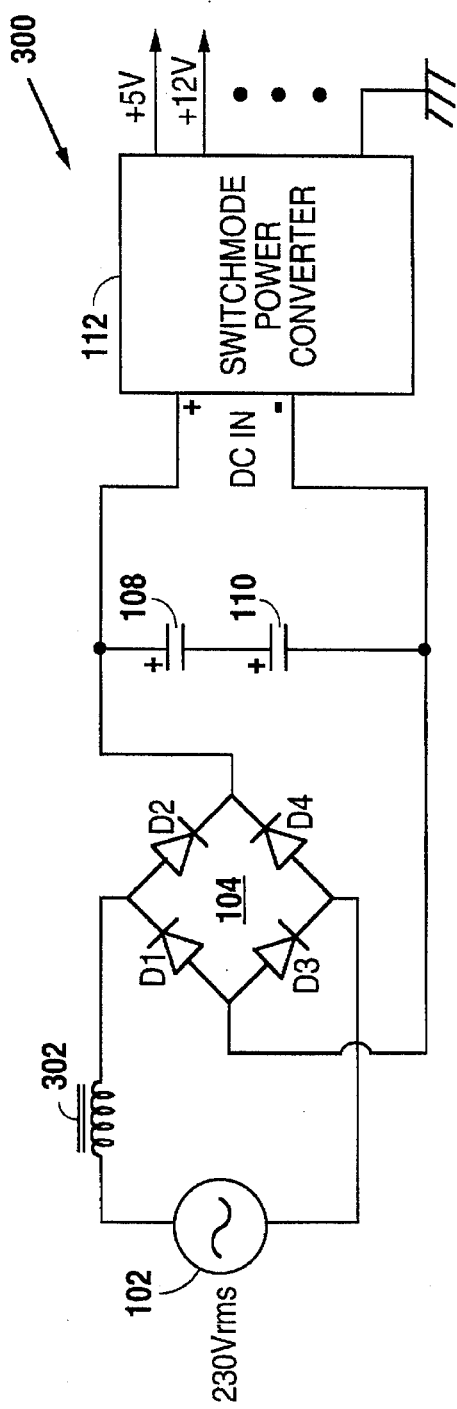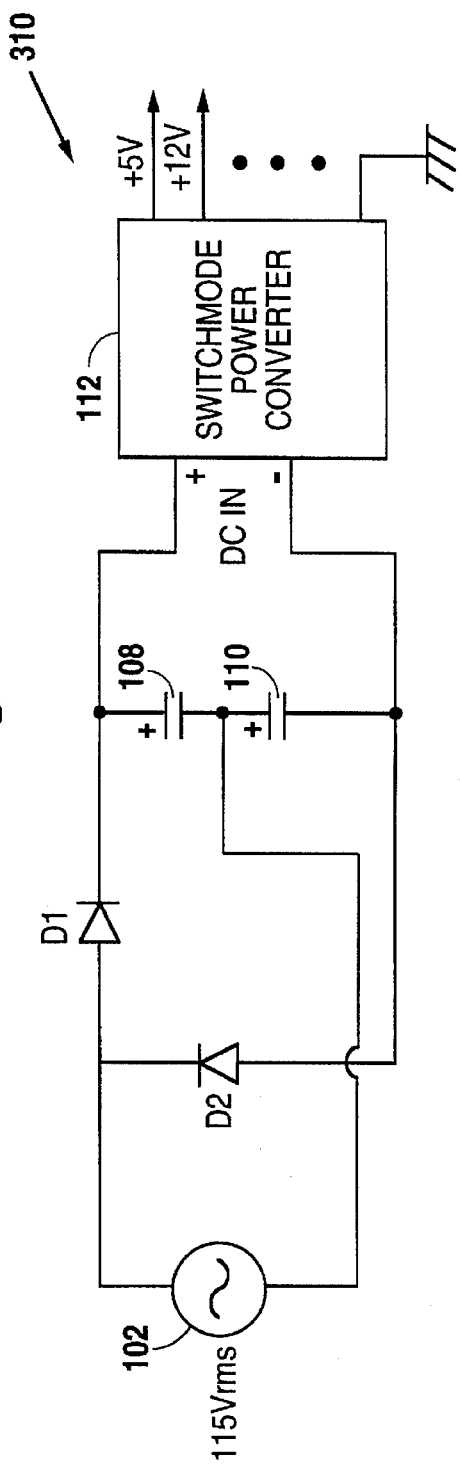

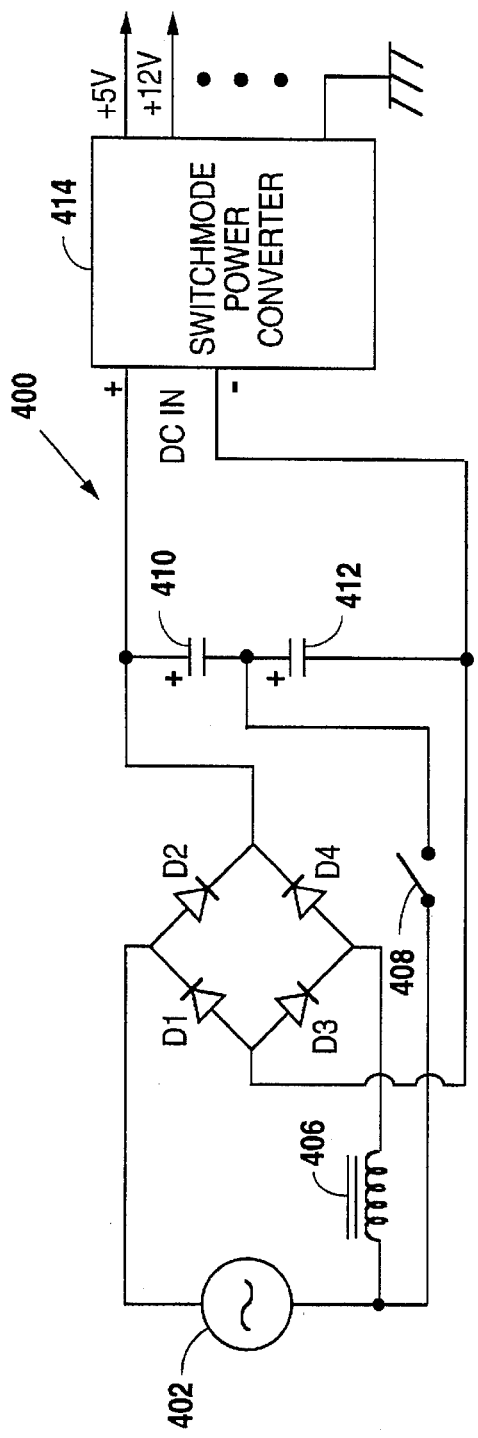
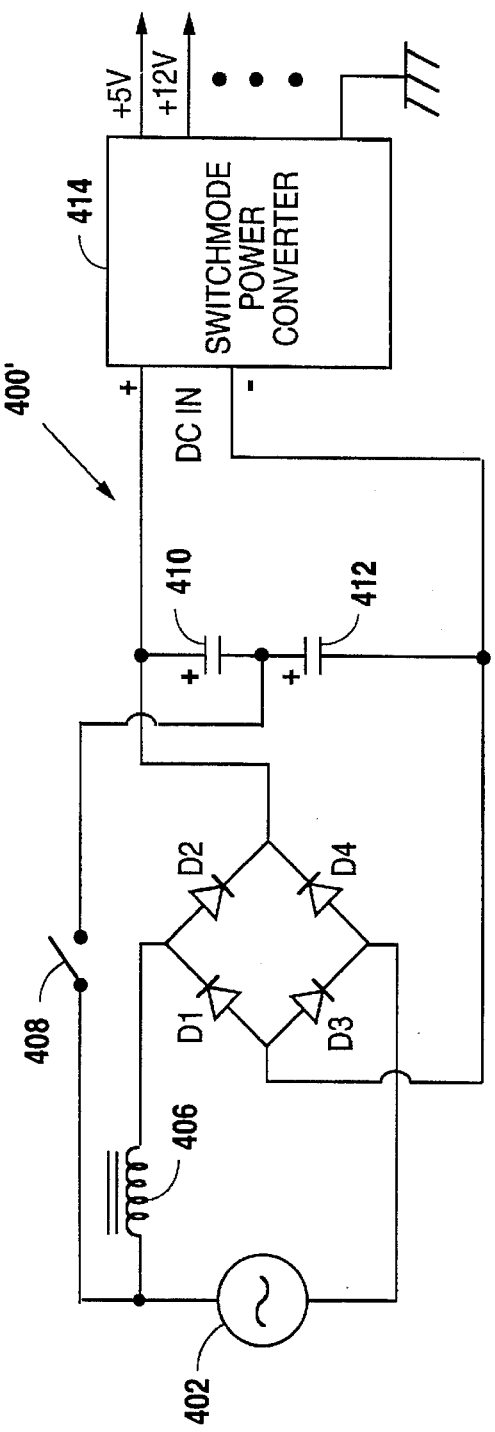

METHOD AND APPARATUS FOR PASSIVE INPUT CURRENT WAVEFORM CORRECTION FOR UNIVERSAL OFFLINE SWITCHMODE POWER SUPPLY

FIELD OF THE INVENTION

The present invention relates to power supplies, and more particularly to passive correction of input current waveform distortion for a universal offline switchmode power supply.

DESCRIPTION OF THE RELATED ART

An offline switchmode power supply requires an input stage for converting the AC voltage from the AC main lines into an unregulated DC voltage. The unregulated DC voltage is provided to a switchmode converter, which converts the unregulated DC voltage into the regulated voltages required to operate an electronic device, such as a computer system. The input stage must be designed for the appropriate level of the AC input voltage, which depends upon the particular market area. Two models are referred to herein, including a North American model with an AC input voltage of 115 V rms for North America and most of the rest of the world other than Europe, and a European model with an AC input voltage of 230 V rms for use in the European market. Both models typically have a frequency range of 50–60 Hertz (Hz). A "universal" power supply typically includes a switch or the like for switching operation between the North American and European models.

The European specification EN-1000-3-2 concerns limits for harmonic currents emissions requiting input current waveform distortion correction, where this standard is more stringent than just about every other corresponding standard throughout the world. An input current filter inductor is one way to meet the European standard, but such an inductor is not required for any markets other than Europe. To meet the EN-1000-3-2 standard and to keep costs as low as possible, most manufacturers will have to produce and stock two separate power supplies, one for the European model and another for the North American model. Having two separate parts and corresponding part numbers is not the most desirable solution from the perspective of cost and convenience.

Another solution is a single power supply with a filter inductor at the AC input of the input stage. The single inductor must be designed, however, to handle twice the current excitation level for operation at 115 V rms, since the average current for 115 V rms is effectively double that of the average current for 230 V rms operation, assuming equal rate of power. Therefore, the resulting inductor, and thus the power supply, is significantly larger and heavier and substantially more expensive.

It is desired to provide a universal offline switchmode power supply without significantly increasing the cost, size or weight of the power supply.

SUMMARY OF THE INVENTION

A universal offline switchmode power supply according to the present invention includes an input stage having an input filter inductor and a switch for switching between a first lower AC voltage and a second higher AC voltage of an AC source. A bridge rectifier full-wave rectifies the higher AC input voltage when the switch is in a first position, where the filter inductor serves to filter the higher AC voltage. The bridge rectifier and two bulk capacitors serve to double the lower AC voltage when the switch is in a second position. Also, the input filter is bypassed for the lower AC voltage.

In the preferred embodiment, the lower AC voltage is 115 V rms and the higher input voltage is 230 V rms. The filter inductor is designed to handle current excitation levels associated with 230 V rms operation, but is not designed to handle the higher current excitation levels associated with 115 V rms operation. In particular, the mass, and thus the size, of the core of the inductor is less than that necessary for 115 V rms, but is sufficient for 230 V rms purposes, where the size of the core is substantially reduced. A smaller core requires less amount of wire to achieve the same number of rams. This reduces the size, weight and cost of the inductor. Reduced wire further decreases the total resistance of the wire windings, which increases the efficiency of the inductor. In particular, the wire generates less heat and thus wastes less energy, thereby increasing the efficiency of the inductor. The switch is preferably a simple single pole, single throw (SPST) switch, which effectively bypasses the inductor for 115 V rms operation, but inserts the inductor as desired for 230 V rms operation.

In the preferred embodiment, the inductor is placed between one AC input line and one input of a bridge rectifier circuit. The outputs of the bridge rectifier circuit are placed across two series input bulk capacitors and to the input of a switchmode power converter. The switch is placed between the same AC input line coupled to the inductor and the junction between the bulk capacitors. When the switch is in its closed position, the filter inductor is effectively bypassed and the diodes of the bridge rectifier circuit and the bulk capacitors serve as a voltage doubler for 115 V rms operation. With the switch is in its open position, the filter inductor performs filtering for the 230 V rms operation and the bridge rectifier circuit full-wave rectifies the AC input voltage.

In this manner, the inductor is bypassed and the voltage is doubled as desired for the higher average current 115 V rms operation. The inductor is switched to filter input current and the voltage is full-wave rectified for 230 V rms operation. Since the inductor is only used for 230 V rms operation, it need not be designed for the higher current excitation levels otherwise required for 115 V rms operation, thereby reducing the overall cost, size and weight of the power supply.

BRIEF DESCRIPTION OF THE DRAWINGS

A better understanding of the present invention can be obtained when the following detailed description of the preferred embodiment is considered in conjunction with the following drawings, in which:

FIG. 1 is a simplified schematic diagram of a universal switch mode power supply including an input stage according to prior art;

FIG. 2 is a simplified schematic diagram of one possible universal switchmode power supply capable of meeting European model input current distortion correction specifications;

FIGS. 3A and 3B are schematic diagrams of two separate, non-universal, switchmode power supplies for the European and North American models, respectively; and FIGS. 4A and 4B are schematic diagrams of universal offline switchmode power supplies according to the present invention.

DETAILED DESCRIPTION OF THE PREFERRED EMBODIMENT

Referring now to FIG. 1, a simplified schematic diagram is shown of a universal offline switchmode power supply 100 according to prior art. An AC input source 102 is connected across the respective input terminals of a full-wave rectifier bridge 104, which includes bridge the diodes D1, D2, D3 and D4. In particular, one terminal of the AC source 102 is provided to the anode of the diode D2 and to the cathode of the diode D1, where the anodes of the diodes D1 and D3 are connected together and the cathodes of the diodes D2 and D4 are connected together. The cathode of the diode D3 is connected to the other terminal of the AC source 102 and to the anode of the diode D4 to complete the bridge.

The cathode of the diode D2 is provided to the positive terminal of an input bulk capacitor 108, having its other end connected to the positive terminal of another input bulk capacitor 110, having its other end connected to the anodes of the diodes D1, D3. The other terminal of the AC source 102 is also connected to one side of a single pole, single throw (SPST) switch 106, having its other end provided to the junction between the capacitors 108, 110.

A switchmode power converter 112 is coupled across the series capacitors 108, 110 for converting the relatively unregulated DC input voltage, referred to as the DCIN signal, into the regulated DC voltage levels required by an electronic device, such as a computer system. The DCIN input voltage is preferably approximately 325 volts for either 115 V rms or 230 V rms operation. The regulated DC voltages include a five volt power signal referred to as +5 V, a twelve volt power signal referred to as +12 V, etc.

Operation of the power supply 100 is now described. The switch 106 is placed in its open position for 230 V rms operation according to the European model, where the AC source 102 provides 230 V rms. The bridge rectifier 104 provides full-wave rectification of the AC input voltage and asserts the rectified voltage across the series capacitors 108, 110 for developing the DCIN signal at approximately 325 V DC. The switchmode power converter 112 converts the unregulated DCIN signal into the regulated voltages required by an electronic device, such as a personal computer system.

For the North American model, where the AC source 102 is providing an input AC voltage of 115 V rms, the switch 106 is placed in its closed position. When the switch 106 is closed, the diodes D1 and D2 operate as a voltage doubler. During the forward portion of each cycle, when the AC input voltage is positive, the diode D2 is forward biased for developing a peak voltage of approximately 163 volts across the capacitor 108. During the reverse portion of the cycle, the diode D1 is forward biased for developing the same peak voltage across the capacitor 110. The peak voltages are added together to develop the DCIN signal at approximately 325 V to the switchmode power converter 112.

The offline switchmode power supply 100 shown in FIG. 1 was adequate for both the European and North American models prior to the promulgation of the regulation EN-1000-3-2, which requires that the harmonic content (indicative of distortion) be reduced and that the power factor be correspondingly increased. Thus, the input current must further be filtered in order to conform to the new regulation EN-1000-3-2 to correct the input current waveform distortion. Correspondingly, although the power supply 100 is still adequate for the North American model, it is no longer universal in that it is not adequate for the requirements of the European model.

FIG. 2 is a simplified schematic diagram of one possible universal power supply for meeting the EN-1000-3-2 specification. The power supply 200 is effectively the same as that shown in FIG. 1, except that a relatively large input series-coupled filter inductor 202 is placed between the anode of the diode D2 and the corresponding terminal of the AC source 102 for filtering the input current waveform.

Operation is essentially the same as that of the power supply 100 shown in FIG. 1, except that the inductor 202 filters input current regardless of the position of the switch 106. For 230 V rms operation, the switch 106 is placed in its open position, and the bridge 104 full-wave rectifies the 230 V rms input voltage for developing the unregulated DCIN signal to the switchmode power converter 112, as previously described. For 115 V rms operation, the switch 106 is placed in its closed position, where the diodes D1 and D2 of the bridge 104 serve to double the voltage for asserting the appropriate voltage level of the DCIN signal for the switchmode power converter 112. However, since the input voltage for 115 V rms operation is approximately half the that of 230 V rms operation and assuming approximately the same rate of power, the resulting average current for 115 V rms operation is effectively doubled.

Thus, the inductor 202 must have twice the current saturation level than otherwise required for 230 V rms operation. Although the inductor 202 is not required for 115 V rms operation, it nonetheless must be designed to withstand the increased current levels. The reason for this is that it is desired to maintain the same inductance of the inductor 202 for all expected current levels. Thus, the inductor 202 must be designed to prevent saturation of the inductor core all current levels, including the higher current levels associated with 115 V rms operation. To achieve this purpose, the mass of the core material of the inductor 202 must be substantially increased to prevent saturation at the higher current levels. This further increases the size of the core, so that more wire is required to achieve the same number of turns around the core. The larger core requires a greater length of wire to achieve the same number of turns. The longer wire also increases the resistance of the winding, which generates a greater amount of heat during operation. To partially offset the increased resistance, the thickness or cross-sectional area of the wire is also increased. The increased amount of wire decreases the efficiency of the inductor 202. The inductor 202 is therefore relatively large, heavy and significantly expensive, thereby significantly increasing the size, weight and cost of the power supply 200.

To meet the European EN-1000-3-2 specification, some manufacturers may choose to provide two separate power supplies with two separate input stages, thereby requiting two separate stocking units (SKU), one for 230 V rms and one for 115 V rms operation. Two possible separate input stages for the European and North American models are shown in FIGS. 3A and 3B, respectively. In FIG. 3A, a simplified schematic diagram is shown of a power supply 300 according to the European model for 230 V rms operation. The power supply 300 is very similar to the power supply 200 shown in FIG. 2, except that the inductor 302 is significantly smaller, lighter and less expensive and the switch 106 is not provided. The inductor 302 has less mass in its core material, so that it would otherwise saturate at the current levels associated with 115 V rms operation. However, the inductor 302 has sufficient mass to prevent saturation at 230 V rms. The smaller core also allows less wire for the windings. The input current is filtered by the inductor 302 in a similar manner as described previously, and the bridge rectifier 104 serves to full-wave rectify the input voltage for developing the unregulated DCIN voltage across the bulk capacitors 108, 110.

The switchmode power converter 112 operates in the same manner for providing the +5 V, +12 V, etc. signals. It is noted, however, that the power supply 300 does not operate correctly with 115 V rms operation, since the voltage doubling capability is not provided. Thus, the inductor 302 need only be designed for smaller current excitation levels, which is sufficient for 230 V rms operation but not for 115 V rms operation. Therefore, the inductor 302, and thus the power supply 300, is smaller, lighter and less expensive than the inductor 202 and power supply 200, respectively.

FIG. 3B is a simplified schematic diagram of the appropriate counterpart for the North American model power supply 310 appropriate for 115 V rms operation. The AC source 102 provides 115 V rms input voltage, where the diodes D1 and D2 operate as a voltage doubler for developing twice the voltage across the capacitors 108, 110. In particular, the diode D1 is forward biased during one-half of the AC input voltage for developing half the voltage across the capacitor 108. The diode D2 is forward biased during the second half-cycle of the AC input signal for developing the second half of the full voltage across the capacitor 110. As before, the combined voltage across the capacitors 108, 110 provide the desired voltage level of the DCIN signal, which is preferably about 325 V DC. It is appreciated that although the input stage of the power supply 310 is simpler than that shown in FIG. 3A, it is only appropriate for use for 115 V rms operation.

It is appreciated that a manufacturer must manufacture and stock two separate parts, including the power supply 300 and the power supply 310, for appropriately providing power supplies for electronic devices according to the European and North American models. This is not desirable from both cost and convenience standpoints.

Referring now to FIG. 4A, a schematic diagram is shown of a universal off-line switchmode power supply 400 implemented according to the present invention. An AC source 402 has one terminal connected to the anode of a the diode D2 of a full-wave bridge rectifier 404. The bridge 404 is essentially identical to the bridge rectifier 104 described previously. The other terminal of the AC source 402 is connected to one end of an inductor 406 and to one side of a switch 408, which is preferably an SPST type switch. The other end of the inductor 406 is provided to the anode of the diode D4. The anodes of the diodes D1, D3 are provided to the negative end of a bulk capacitor 412 and the other end of the switch 408 is provided to the positive end of the capacitor 412 and to the negative terminal of another bulk capacitor 410. The cathodes of the diodes D2, D4 are provided to the positive input of the capacitor 410, and the capacitors 410 and 412 are coupled in series for providing a DCIN signal of approximately 325 V to a switchmode power converter 414. Again, the switchmode power converter 414 converts the unregulated DCIN signal to the voltages required by an electronic device, such as a computer system, including +5 V, +12 V, etc.

The inductor 406 is similar to the inductor 302 and filters the input current waveform for reducing harmonic distortion to the appropriate levels required by European standard EN-1000-3-2. It is noted that the inductor 406 need only have the appropriate core mass associated with the current excitation levels of 230 V rms operation and need not be designed for 115 V rms operation. In particular, the mass and size of the core is relatively small as compared to the mass and size of the core of the inductor 202. Consequently, a shorter amount of wire is required to achieve the same number of turns around the core, thereby decreasing the size and weight of the inductor. This decreases the resistance of the core, thereby increasing its efficiency during operation. Further, the wire need not be as thick. Thus, the inductor 402 is similar in size, weight, cost and current saturation specification levels as the inductor 302, which significantly smaller, lighter and less expensive than the inductor 202. Furthermore, the inductor 402 is significantly more efficient than the inductor 202.

For 230 V rms operation, the switch 408 is placed in its open position so that the rectifier bridge 404 full-wave rectifies the input AC voltage for developing an unregulated DC voltage of approximately 325 V across both capacitors 410, 412. For 115 V rms operation, the switch 408 is placed in its closed position, effectively bypassing the inductor 406. When closed, the diodes D1 and D2 serve to double the input 115 V rms voltage for developing the appropriate voltage of the unregulated DCIN signal. During the first-half of each cycle, the diode D2 is forward biased for developing half the DCIN voltage across the capacitor 410, and during the second half of each cycle, the diode D1 is forward biased for developing the second half of the DCIN voltage across the capacitor 412. The diodes D3 and D4 are not used, so that no current passes through the inductor 406 during 115 V rms operation.

FIG. 4B is a schematic diagram of a universal off-line switchmode power supply 400', which is similar to the power supply 400, except that the switch 408 and the inductor 406 are connected to the opposite terminal of the AC source 402. Operation is essentially the same.

It is appreciated that a universal offline switchmode power supply according to the present invention is appropriate for use according to the European as well as the North American models, where a switch is used for switching between the two models. An inductor serves to meet the European standards for input current harmonic distortion correction, but need not be designed for higher current excitation levels associated with 115 V rms operation. Thus, the filter inductor does not significantly increase the cost, size or weight of the power supply. In this manner, a power supply according to the present invention, such as either power supply 400 or 400', is superior to the other possible solutions shown in FIGS. 2, 3A and 3B since only one power supply is necessary for universal operation, including operation in Europe.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. An input stage for a universal offline switchmode power supply for receiving and converting either a first lower AC input voltage or a second higher AC input voltage across first and second output terminals of an AC source, comprising:

a bridge rectifier having first and second input terminals and first and second output terminals, wherein said first input terminal is for coupling to the first output terminal of the AC source;

first and second capacitors having one end each coupled together forming a center junction and having their other ends coupled to said first and second output terminals of said bridge rectifier, respectively;

a filter inductor having a first end coupled to said second input terminal of said bridge rectifier and a second end for coupling to the second output terminal of the AC source; and a switch having a first terminal coupled to said second end of said input filter inductor and a second terminal coupled to said center junction of said first and second capacitors.

2. The input stage of claim 1, wherein said filter inductor has sufficient core mass to prevent current saturation for operation at the second higher AC input voltage, but does not have sufficient core mass to prevent current saturation at the first lower AC input voltage.

3. The input stage of claim 1, wherein said switch has an open position for receiving the second higher AC input voltage so that said bridge rectifier full wave rectifies the second higher AC input voltage, and a closed position for receiving the first lower AC input voltage wherein said bridge rectifier and said first and second capacitors double the first lower AC input voltage.

4. The input stage of claim 3, wherein said input filter inductor is bypassed when said switch is in said closed position.

5. The input stage of claim 1, wherein the first lower AC input voltage is approximately 115 V rms and wherein the second higher AC input voltage is approximately 230 V rms.

6. The input stage of claim 1, wherein said filter inductor has sufficient core mass for the lower current excitation levels at the second higher AC input voltage, but does not have sufficient core mass for the higher current excitation levels at the first lower AC input voltage.

7. The input stage of claim 1, wherein said bridge rectifier comprises four diodes coupled as a bridge.

8. The input stage of claim 1, wherein said bridge rectifier comprises:
a first diode having an anode as said first input terminal and a cathode as said first output terminal of said bridge rectifier;
a second diode having an anode as said second input terminal of said bridge rectifier and a cathode coupled to said cathode of said first diode;
a third diode having an anode as said second output terminal of said bridge rectifier and a cathode coupled to said anode of said second diode; and
a fourth diode having an anode coupled to said anode of said third diode and a cathode coupled to said anode of said first diode.

9. The input stage of claim 1, wherein said switch comprises a single pole, single throw switch.

10. A universal offline switchmode power supply for receiving and converting either a first lower AC input voltage or a second higher AC input voltage across first and second output terminals of an AC source, comprising:
a bridge rectifier having first and second input terminals and first and second output terminals, wherein said first input terminal is coupled to the first output terminal of the AC source;
first and second capacitors having one end each coupled together forming a center junction and having their other ends coupled to said first and second output terminals of said bridge rectifier, respectively;
a filter inductor having a first end coupled to said second input terminal of said bridge rectifier and a second end coupled to the second output terminal of the AC source;
a switch having a first terminal coupled to said second end of said filter inductor and a second terminal coupled to said center junction of said first and second capacitors; and
a switchmode power converter coupled across said output terminals of said bridge rectifier for receiving an unregulated DC voltage and for providing regulated DC voltages.

11. The input stage of claim 10, wherein said filter inductor has sufficient core mass to prevent current saturation for operation at the second higher AC input voltage, but does not have sufficient core mass to prevent current saturation at the first lower AC input voltage.

12. The power supply of claim 10, wherein said switch has an open position for receiving the second higher AC input voltage so that said bridge rectifier full wave rectifies the second higher AC input voltage, and a closed position for receiving the first lower AC input voltage wherein said bridge rectifier and said first and second capacitors double the first lower AC input voltage.

13. The power supply of claim 12, wherein said input filter inductor is bypassed when said switch is in said closed position.

14. The power supply of claim 10, wherein said first lower AC voltage is approximately 115 V rms and wherein said second higher AC voltage is approximately 230 V rms.

15. The power supply of claim 10, wherein said bridge rectifier comprises four diodes coupled as a bridge.

16. The power supply of claim 10, wherein said bridge rectifier comprises:
a first diode having an anode as said first input terminal and a cathode as said first output terminal of said bridge rectifier;
a second diode having an anode as said second input terminal of said bridge rectifier and a cathode coupled to said cathode of said first diode;
a third diode having an anode as said second output terminal of said bridge rectifier and a cathode coupled to said anode of said second diode; and
a fourth diode having an anode coupled to said anode of said third diode and a cathode coupled to said anode of said first diode.

17. The power supply of claim 10, wherein said switch comprises a single pole, single throw switch.

18. A universal power supply, comprising:
an AC source having first and second output terminals for providing either a first lower AC voltage or a second higher AC voltage;
a bridge rectifier having first and second input terminals and first and second output terminals, wherein said first input terminal is coupled to said first output terminal of said AC source;
first and second capacitors having one end each coupled together forming a center junction and having their other ends coupled to said first and second output terminals of said bridge rectifier, respectively;
a filter inductor having a first end coupled to said second input terminal of said bridge rectifier and a second end coupled to said second output terminal of said AC source;
a switch having a first terminal coupled to said second end of said filter inductor and a second terminal coupled to said center junction of said first and second capacitors; and
a switchmode power converter coupled across said output terminals of said bridge rectifier for receiving an unregulated DC voltage and for providing regulated DC voltages.

19. The power supply of claim 18, wherein said filter inductor has sufficient core mass to prevent current saturation for operation at said second higher AC voltage, but does not have sufficient core mass to prevent current saturation at said first lower AC voltage.

20. The power supply of claim 18, wherein said switch has an open position for receiving said second higher AC voltage so that said bridge rectifier full wave rectifies said second higher AC voltage, and a closed position for receiving said first lower AC voltage wherein said bridge rectifier and said first and second capacitors double said first lower AC voltage.

* * * * *